(12) United States Patent
Salovuori et al.

(10) Patent No.: US 8,661,078 B2
(45) Date of Patent: Feb. 25, 2014

(54) APPLICATION OF UNRELIABLE TRANSFER MECHANISMS

(75) Inventors: Heikki Salovuori, Helsinki (FI); Tapio Savunen, Helsinki (FI); Olli-Pekka Lahtinen, Helsinki (FI)

(73) Assignee: Cassidian Finland Oy, Helsinki (FI)

( * ) Notice: Subject to any disclaimer, the term of this patent is extended or adjusted under 35 U.S.C. 154(b) by 237 days.

(21) Appl. No.: 13/260,282

(22) PCT Filed: Mar. 31, 2010

(86) PCT No.: PCT/EP2010/054273
§ 371 (c)(1),
(2), (4) Date: Sep. 24, 2011

(87) PCT Pub. No.: WO2010/115794
PCT Pub. Date: Oct. 14, 2010

(65) Prior Publication Data
US 2012/0023259 A1 Jan. 26, 2012

(30) Foreign Application Priority Data

Apr. 8, 2009 (EP) .................................... 09157588

(51) Int. Cl.
*G06F 15/16* (2006.01)
(52) U.S. Cl.
USPC ............ 709/203; 709/220; 709/224; 709/225
(58) Field of Classification Search
USPC .................. 709/203, 220, 225, 228
See application file for complete search history.

(56) References Cited

U.S. PATENT DOCUMENTS

| | | | | |
|---|---|---|---|---|
| 6,985,461 | B2 * | 1/2006 | Singh | 370/329 |
| 7,747,730 | B1 * | 6/2010 | Harlow | 709/224 |
| 2002/0176386 | A1 * | 11/2002 | Singh | 370/338 |
| 2006/0080092 | A1 | 4/2006 | Sherman | |
| 2007/0127393 | A1 * | 6/2007 | Car | 370/254 |
| 2007/0300234 | A1 | 12/2007 | Dekel | |
| 2008/0098446 | A1 | 4/2008 | Seckin et al. | |

FOREIGN PATENT DOCUMENTS

| | | |
|---|---|---|
| GB | 2 398 452 A | 8/2004 |
| GB | 2398452 | 8/2004 |
| WO | 2006/110322 | 10/2006 |
| WO | 2006/110322 A2 | 10/2006 |
| WO | 2008/040021 | 4/2008 |
| WO | 2008/040021 A1 | 4/2008 |

OTHER PUBLICATIONS

European Search Report application No. 09157588.6 dated Nov. 13, 2009.
International Search Report application No. application No. PCT/EP2010/054273 dated Sep. 14, 2010.
International Search Report, and Written Opinion of the International Searching Authority; Issued on International Application No. PCT/EP2010/054273.

* cited by examiner

*Primary Examiner* — Khanh Dinh
(74) *Attorney, Agent, or Firm* — Squire Sanders (US) LLP

(57) ABSTRACT

A method for improved application of unreliable transfer mechanisms. An application uses application data delivered in data packets that become accessible from a peer entity via at least two packet data transmission mechanisms. The application is configured with a predefined operational range for a predefined application-specific characteristic. If the predefined application-specific characteristic exceeds the predefined operational range, the packet data transmission mechanism is changed. The mechanism facilitates maintaining an application-specific service level even if unreliable transmission mechanisms are applied.

18 Claims, 3 Drawing Sheets

APPLICATION OF UNRELIABLE TRANSFER MECHANISMS

FIELD OF THE INVENTION

The present invention relates to information systems and especially to information systems working on unreliable packet data transmissions.

BACKGROUND ART

In packet-switched communications logical data flows are transmitted as a stream of addressed packets. The packets may be forwarded by network nodes in a first-come first-serve fashion, or forwarded according to some scheduling discipline for fair queuing or differentiated and/or guaranteed quality of service. Examples of packet switching systems comprise the Internet, local area networks, and some advanced cellular communications networks.

The set of communications protocols commonly used for the Internet and other similar networks is called as the Internet Protocol (IP) suite. The Internet Protocol (IP) handles lower-level transmissions from computer to computer as a message makes its way across the Internet. On top of IP there are higher level protocols that offer different types of reliability measures for the transmissions.

The Transmission Control Protocol (TCP) operates over IP and provides in endpoints a variety of procedures to facilitate reliable, ordered delivery of a stream of data between these endpoints. As another option, the User Datagram Protocol (UDP) assumes that error checking and correction is either not necessary or performed by the application, avoiding the overhead of such processing at the network interface level. Time-sensitive applications often use UDP because dropping packets is preferred over using delayed packets.

TCP and UDP are used here as examples of reliable and unreliable transmission protocols of one particular protocol suite. More generally, unreliable transmission refers here to any protocol of any protocol suite where the transmission mechanism does not control that data packets are received successively from the transmission path. Accordingly, if a packet is dropped or delayed in transmission, the upper layer may have to perform its operations without it, sometimes even without knowing that one packet is missing from the sequence.

Recently, the low overhead and time-sensitiveness of unreliable transmission mechanisms has been considered important and more and more applications are designed to apply unreliable data transmission mechanisms. Typically the applications can deal with small and temporary degradations in the transmission path, but if the number of dropped packets gets too high, the quality of service offered by the application naturally deteriorates.

Such deteriorations are conventionally avoided by subscribing for the applications network service levels with generous safety margins to absorb and/or compensate any dynamic deviations in the network. However, most of the time such safety margins consume costly resources unnecessarily. Due to severe commercial competition both service providers and network operators nowadays seek actively mechanisms that improve possibilities to apply unreliable data transmission mechanisms between communicating hosts but at the same time enable optimizing the service level requirements posed to the network connecting the hosts.

SUMMARY

An object of the present invention is thus to improve application of unreliable communications in packet data transmissions. The object is achieved by a method, an information system, a module and a computer program product, which are characterized by what is stated in the independent claims. The preferred embodiments of the invention are disclosed in the dependent claims.

The application is configured with a predefined, application-specific operational limit that reflects the quality of application data reception. The level of quality is monitored by reading the content of the application data and determining from the content of the received application data a value for a predefined application-specific characteristic that varies for successive data packets according to the success or failure of their transmissions in the transmission path. When the quality of application data reception is not within the predefined operational limit, the application initiates a change of the packet data transmission mechanism applied in transmissions with the peer entity.

The mechanism facilitates maintaining an application-specific service level even if unreliable transmission mechanisms are applied. The monitoring system may operate individually in different applications, so each application may manage its own service level. Further advantages of the invention are discussed with description of the disclosed embodiments of the invention.

BRIEF DESCRIPTION OF THE DRAWINGS

In the following, embodiments will be described in greater detail with reference to accompanying drawings, in which FIG. 1 provides a functional description of roles of essential elements in an information system.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any terminal, network node, and/or to any information system or any combination of different information systems that support execution of applications. The information system may be a fixed communication system or a wireless communication system or a communication system utilizing both fixed networks and wireless networks. The protocols, the specifications of communication systems, servers and user terminals develop rapidly. Such development may require extra changes to an embodiment. Therefore, all words and expressions should be interpreted broadly and they are intended to illustrate, not to restrict, the embodiment.

Figure 1:
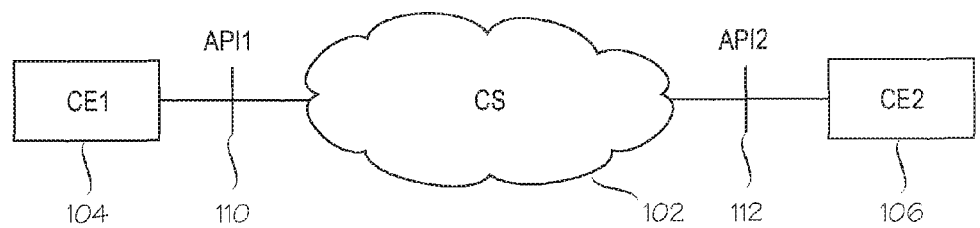

FIG. 1 provides a functional description of roles of essential elements in an information system 100 according to an embodiment of the invention. In general the term information system relates to a combination of persons, data records and activities that automatically and manually process data and information in a given organization. In this context the information system relates more specifically to an information technologies component of a generic information system, and therefore refers to any telecommunications and/or computer related equipment or interconnected system or a group of subsystems of equipment that may be used in the acquisition, storage, manipulation, management, movement, control, display, switching, interchange, transmission, or reception of information, and includes software, firmware, and/or hardware.

Telecommunications service 102 refers to a specified set of information transfer capabilities provided by the information system 100 to one or more communication entities 104, 106. A communication entity (CE) 104, 106 comprises a collection of computer programs that autonomously or through interaction with a user accesses the telecommunications service 102. CE may thus comprise system software, testware, middleware, firmware, application software, or the like. For example, CE may comprise a voice codec that uses the services of media access control (MAC) protocol to input coded data for transfer over a communications system. On the other hand, CE may comprise a base station mobility management functionality that uses services of a mobile link control entity (MLE) protocol to acquire information on location of a particular subscriber of the communications system.

In computing, a protocol stands for a convention or standard that controls or enables a connection, communication, and data transfer between two computing endpoints. Protocols may be implemented by hardware, software, or a combination of the two. Communication protocols for digital computer network communication have features that are intended to ensure reliable interchange of data over an imperfect communication channel. A communication entity CE1, CE2 accesses the telecommunications services via a set of standardized requests, called application programming interfaces (API) 108, 110 that have been defined for the telecommunications service of the information system 100.

Figure 2:
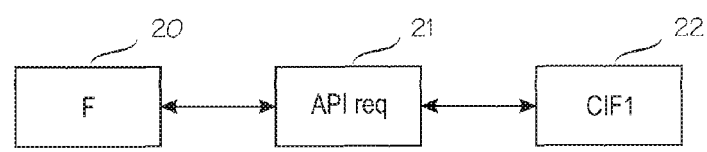
FIG. 2 illustrates relationships of elements an embodiment of a communication device.

Typically a communication entity CE1, CE2 accesses via API a set of layered communication protocols that are selected to provide necessary service level for the functions of CE1, CE2. A request to API translates into a combination of applied protocols and a set of parameters used in their application. In a communication device, like a terminal or a network node, each different combination of a set of applied protocols and a set of parameters used in their application corresponds to a communication paradigm that is hereinafter considered as a separate communication interface. As illustrated with the block diagram of FIG. 2, in conventional communication devices, the relationship between a CE application function F 20 that involves information transfer, an API request 21 for transfer of the information, and a communication interface CIF1 22 applied for the transfer is one-to-one such that activation of the application function F generates a defined API request that is implemented via CIF1, and information transferred to the communication device over CIF1 translates into an incoming API call that associates to the defined application function F. The application function F may comprise a single operation or a plurality of inter-related operations of the application.

The advantage in such arrangement is that the operations of the communication interfaces are transparent to the applications, so the application providers do not need consider the transfer details and imperfections in the various links. However, the downside is that success and failure of application functions are dependent on the achieved service level of the applied communication interface. Depending on the underlying conventions and protocols of the applied communication interface the application may have or get information on the transfer it initiated, and thereby interpret whether the communication interface provided the desired service level or not. If this kind of feedback procedure is available, the application may be configured to react to possible failure situations and initiate retransmissions or activate alternative functions to remedy the situation. However, if such feedback procedure from the underlying network services to the application does not exist or is not utilized, or the deviation from the desired service level manifests itself in a manner that is not carried over through the lower layer feedback procedures, the application is not able to adjust its operation dynamically to the existing network conditions. Deviations from the designed service level show as failures of the operation of the application.

The conventional remedy is to apply acknowledged transmissions or service levels with generous safety margins to absorb and/or compensate the dynamic deviations in the network. However, due to the continued evolvement towards packet switched transmissions, these conventional approaches are turning obsolete. It has been noted that unreliable transmissions are well suited for dynamic multi-user packet switched communications. Effective unreliable data distribution methods are thus greatly favored in new advanced networks. On the other hand, due to severe commercial competition, service providers and network operators cannot afford to maintain service level agreements with exaggerated safety margins. A more effective method for improving the success of unreliable data transmissions between communication entities is needed.

Figure 3:
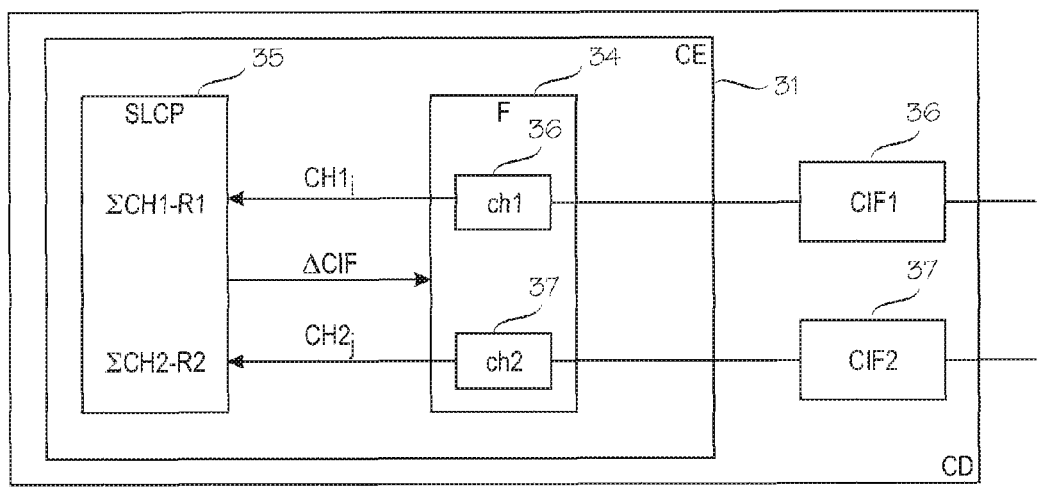
FIG. 3 illustrates some elements applied in the embodied communication device.

The block chart of FIG. 3 illustrates some elements applied in an embodied communication device CD 30. FIG. 3 is a simplified architecture only illustrating some elements and functional entities as logical units of a communication device. It should be appreciated that the communication device may comprise other units used in or for performing other functions of the communication device. However, they are irrelevant to the actual invention and, therefore, are not to be discussed in more detail here.

The communication device may be any node or a host which is able to communicate in a communications system. The communication device may also be a user terminal which corresponds to a piece of equipment or a device that is arranged to associate the user terminal and its user with a subscription and allows a user to interact with a communications system. The user terminal may be any terminal capable of receiving information from and/or transmitting information to the network, connectable to the network wirelessly or via a fixed connection. Examples of the user terminal include a personal computer, a game console, a laptop (a notebook), a personal digital assistant, a mobile station (mobile phone), and a line telephone.

An embodied communication device comprises not only prior art means, but also a communication entity CE 31 that represents means for utilizing the communication interfaces CIF1 32 and CIF2 33 of the communication device CD 30. CE 32 comprises at least one function F 34 that via defined API requests may apply at least either of the communication interfaces CIF1 32 and CIF2 33.

Present communication devices comprise processors and a memory that can be utilized in an embodiment. For example, the communication entity 32 may be a software application, or a module, or a unit configured as arithmetic operation, or as a program, executed by an operation processor. All modifications and configurations required for implementing functionality of an embodiment may be performed as routines, which may be implemented as added or updated software routines, application circuits (ASIC) and/or programmable circuits.

Software routines, also called program products, including applets and macros, can be stored in any communication device-readable data storage medium and they include program instructions to perform particular tasks. Software routines may be downloaded into a communication device.

The communication device, such as a server, or a corresponding server component, or a user terminal may be configured as a computer including at least a memory for providing storage area used for arithmetic operation and an operation processor for executing the arithmetic operation. An example of the operation processor includes a central processing unit. The memory may be a fixed or removable memory detachably connected to the communication device.

As shown in FIG. 3, the communication device CD 30 also comprises a service level control element SLCP 35 that is operatively connected to the function F 34, Operative connection includes at least the options that SLCP is an integral part of F, or a separate element to/from which F may input/output information. Let us first assume that CIF1 is a default interface of F. CIF1 is configured to apply unreliable transmissions, i.e. F does not have information on packets lost in the transmission path. Accordingly, CIF1 it does not provide lower layer feedback to F on success or failure of transmissions via it. However, F receives via the lower protocol layers of CIF1 application data blocks that have been delivered transparently through the lower protocol layers of CIF1 and comprise information that is legible to F. Application data may thus be considered as a payload part of transferred information such that it is intelligible to the communicating applications but remains transparent to the intermediate nodes and lower protocol layers. Transparent in this context means that the lower layer protocols do not use content of the application data blocks in their own procedures and thus the content passed over to F does not have to have any semantic meaning to the lower layer functions. In the embodiment, a characteristic of the application data is used by F as an operational characteristic ch1 36 on the basis of which it can monitor the unreliable transmissions implemented via CIF1 without direct feedback from the lower protocol layers of CIF1.

Accordingly, during operation, F receives data via CIF1, applies the received data and at defined times determines from the content of received application data packets a status indicator value $CH1_i$ of ch1 and inputs it to SLCP. SLCP receives the input status indicator values and updates the information from status indications $CH1_i$ into an accumulated value $\Sigma CH1$. The period of accumulation varies from case to case. For example, the value of a new indicator $CH1_i$ may be used to replace the earlier value at each time. Alternatively, the value of the new indicator $CH1_i$ may be used in a defined equation to calculate long-term averages of the accumulated value $\Sigma CH1$. Other accumulation and averaging mechanisms may be applied without deviating from the scope of protection.

SLCP monitors the operational characteristic ch1 of F from the content of the received application data and associates a state or a range of states of ch1 to a deviation in the service level of CIF1. When SLCP detects such deviation, it informs F on it and may instruct F to initiate a corrective action, for example select another communication interface that applies a different communication paradigm. In the embodiment of FIG. 3, a range R1 of values of the accumulated value $\Sigma CH1$ are associated to a specific service level in CIF1. When the accumulated value $\Sigma CH1$ exceeds this range R1, SLCP inputs to F an indication $\Delta CIF$. When F receives the $\Delta CIF$ indication from SLCP, it knows that the service level of CIF1 is at least temporarily not acceptable and initiates a corrective action. For example, F may be configured with a predefined condition that begins to apply CIF2 when the service level of CIF1 is not acceptable. The condition may be this simple, or comprise a logical decision chain involving a number of communication interfaces.

SLOP may monitor CIF1 only, or it may monitor similarly results of several unreliable communication interfaces. For example, also CIF2 may be associated with an operational characteristic ch2 37, which may be the same or different than ch1. Then SLCP, on the basis of status indicators CH2, input by F, maintains correspondingly an accumulated value $\Sigma CH2$ for monitoring the operational characteristic ch2 and notifies F when the accumulated value $\Sigma CH2$ reaches a range R2 associated to a specific service level deviation of CIF2. The decision of the order of the attempted communication interfaces may be made in SLCP or F, depending on the application. If the accumulated value of both of the communication interfaces is inadequate, the CE may generate an error message to be output to the user of the communication device or an external node monitoring or logging the operation of the communication device.

The operational characteristic ch1, ch2 refers here to a property that is measurable by the application function on the basis of data content in the application information received by the application function via unreliable data transmissions. The invention applies to a variety of systems, nodes and protocols so also the monitored operational characteristics ch1, ch2 may vary considerably, from application to application. In the following, some exemplary embodiments are described in more detail.

Figure 4:
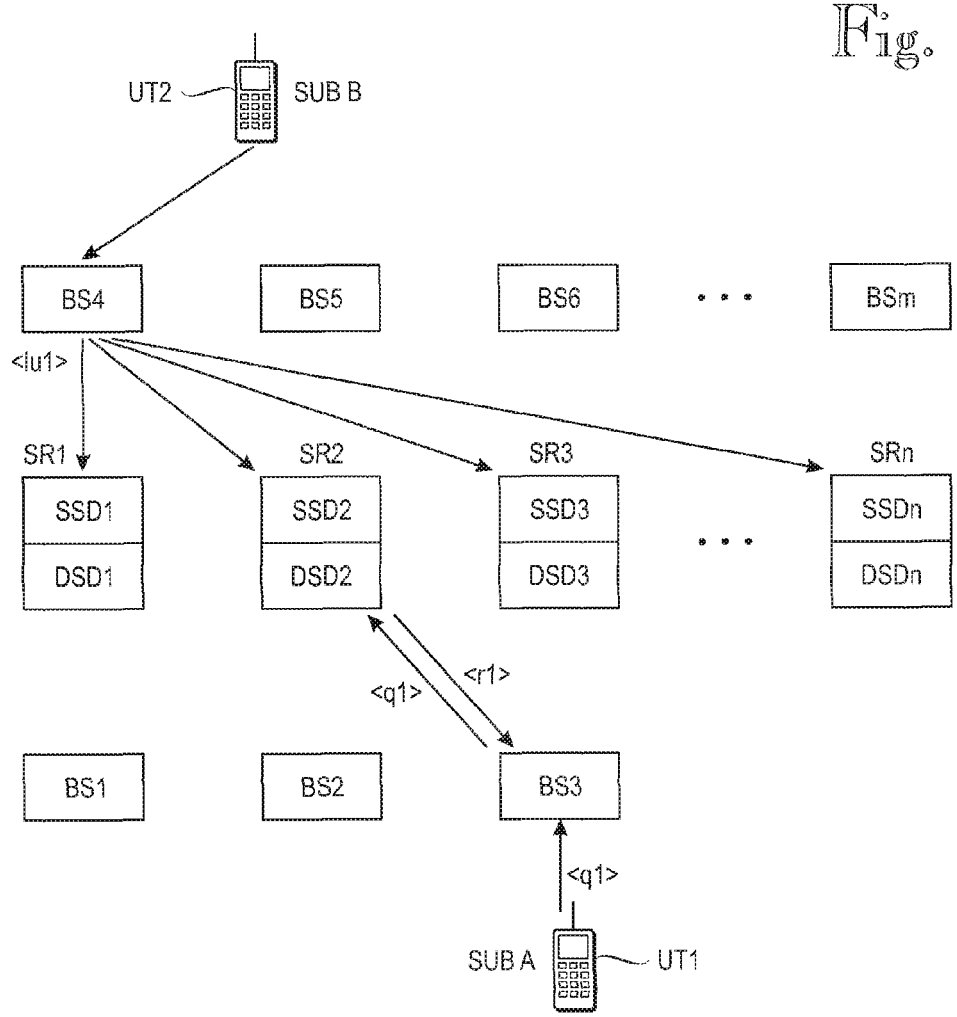
FIG. 4 illustrates an embodiment of a cellular communications system.

FIG. 4 illustrates an embodiment of a cellular communications system according to the invention. One of the essential processes of cellular networks is mobility management. The aim of the mobility management is to track where mobile subscribers are located, in order to deliver the calls, data messages and other services to them. Mobility management is based on location update procedure, which allows a user terminal to inform the cellular network about events regarding its location, for example, when the terminal moves from one location area to the next one. Location update enables a user terminal to have reliable access to the network and be reached with a call, while enjoying the freedom of mobility within the whole coverage area.

In the present embodiment, the network of the communications system comprises a plurality of subscriber registers SR1, SR2, SR3, . . . , SRn and a plurality of base stations BS1, BS2, . . . , BSm, connected to a packet data network that provides packet switched communications to elements connected via it. It is noted that the applied configuration in the embodiment is a simplified example only. The base station configuration may vary considerably from implementation to implementation. The base stations receive location update messages from user terminals UT1, UT2 and act as event sources by providing the location update messages as event data items to the subscriber registers that store them as event data. In the present embodiment the databases are essentially parallel database instances that comprise both static subscriber data instances SSD1, SSD2, . . . , SSDn and dynamic subscriber data instances DSD1, DSD2, . . . , DSDn of all user terminals UT1, UT2.

From the plurality of base stations BS1, BS2, . . . , BSm, a group of base stations BS1, BS2, BS3 are in area where a subscriber A with user terminal UT1 presently resides and another group of base stations BS4, BS5, . . . , BSm in an area where another subscriber B with user terminal UT2 presently resides. When a base station BS4 receives a location update message from a user terminal UT2, it sends the message <lu1> as an event data item to all subscriber registers SR1, SR2, SR3, . . . , SRn using a defined unreliable packet switched protocol. This means that when a base station BS4 sends information on a location data update of UT2 of subscriber B to a database instance SR1, retransmission of the location update to SR1 is not dependent on acknowledgement from SR1, i.e. BS3 does not necessarily retransmit the location update to SR1, even if no acknowledgement is received from SR1.

When subscriber A that resides presently in the cell of BS3 wishes to call subscriber B, it initiates a call setup procedure in UT1. The call setup procedure is a task that applies event data of mobility management. In order to access appropriate call set-up parameters, a relevant subscriber register needs to be accessed. In the present embodiment, BS3 of subscriber A may select the database instance to which it sends the query requesting information on the present cell of subscriber B freely, i.e. randomly or according to any defined unique or ubiquitous selection criterion or criteria. In the present application, let us assume that BS3 is configured to send the query <q1> to SR2 that is geographically closest to it. SR2 responds with a message <r1> that includes UT1 as the present cell of BS4.

Having this information, BS3 sends the call setup signaling message to BS4 and if BS4 responds accordingly, the call setup continues normally from there on. The probability that the location information in a subscriber register is correct depends by far on the transmission mechanism used to deliver the location update message.

Figure 5:
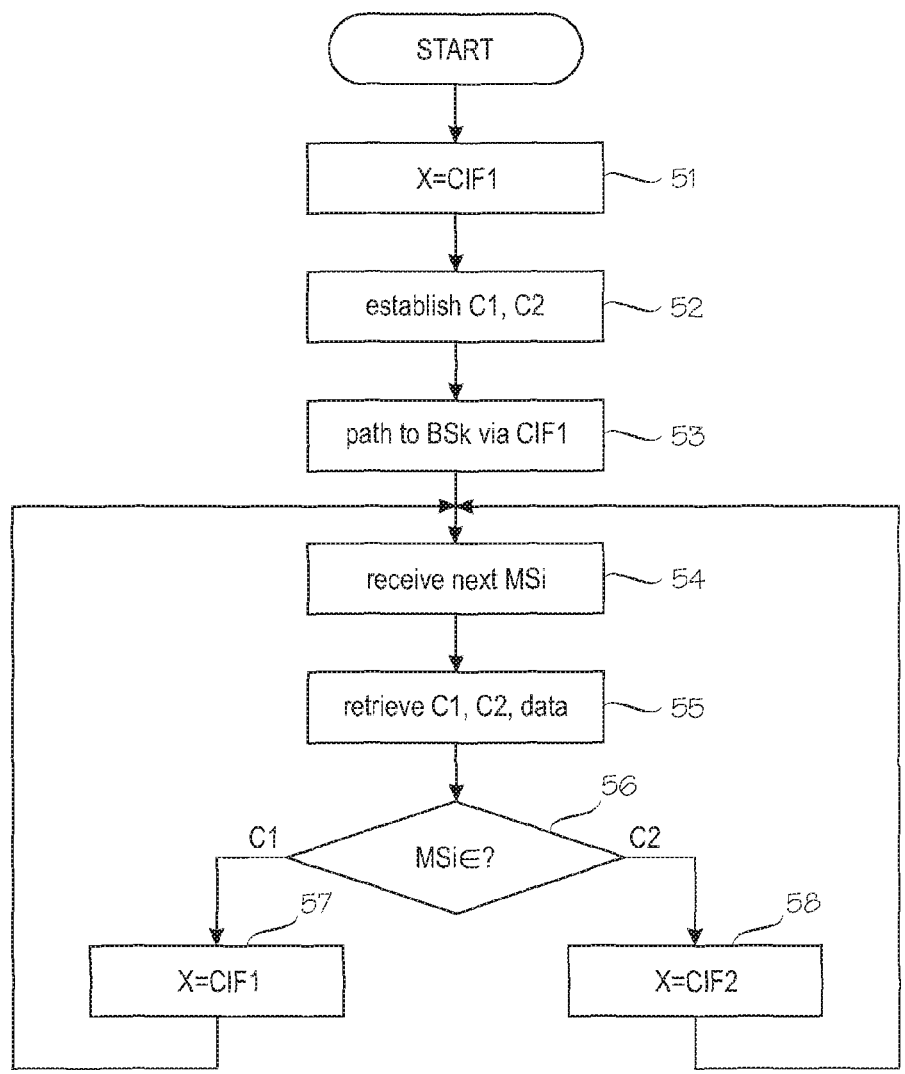
FIG. 5 illustrates steps of an embodiment of a method.

Let us now use as an example of the communication device of FIG. 3 one of the database instances SRi of FIG. 4. The corresponding exemplary application function F comprises maintenance of location data of user terminals on the basis of location update messages via unreliable data transmissions. SLOP corresponds to an entity that is responsible to control that the reception of location data update messages is continuously optimized. SLOP may be operatively connected to F or be a sub-function of the application function F. FIG. 5 illustrates steps of an exemplary embodiment of a method applied in SRi.

It is noted that the elements shown in FIG. 3 are SRi logical entities and illustrate functions that are necessary for implementing defined operations within the communication device. The functions in the communication device are typically implemented as computer operations on received and/or stored data according to predefined, essentially programmed processes. The implementation of the logical entities may be divided to one or more physical entities of the communication device of SRi. The method of FIG. 5 applies to a SRi element, even though separate references are also made to the included functional entities.

The procedure begins when the database instance SRi is switched on and F is operative for receiving location update messages. Since the desired mode of operation is via unreliable transmissions, the database instance SRi has a default communication interface CIF1 that corresponds to a combination of applied protocols and a set of parameters used in their application. For CIF1 in SR1 the combination of applied protocols and parameters create a communication paradigm that enables receiving multicast transmissions from BSk. IP multicast technology utilizes user datagram protocol (UDP) as an underneath protocol, and does not provide explicit mechanisms to ensure successful data transmission. In the beginning, this default communication interface CIF1 is activated (step 51) for use in communications between BSk and SRi. In addition to CIF1, SRi also comprises an alternative communication interface for more reliable transmissions, here CIF2 applying transmission control protocol (TCP) in exchange of IP packets with BSk.

In order to be able to monitor the transmission path between BSk and SRi, SRi is configured to collect status information on the transmissions implemented via CIF1 on the basis of application data, without direct feedback from underlying protocols of CIF1. This is done in F by monitoring a defined operational characteristic ch1 in the received content. In this example base stations are assumed to transmit location information at defined intervals, so ch1 is designed to correspond with consistency of the series of successful transmissions of location information and ch1 is monitored on the basis of values of timestamps in successive location update messages. Thus SLCP of F establishes (step 52) conditions C1 and C2, where C1 associates to a level of consistency that matches with operating over CIF1, and C2 associates to a level of consistency that matches with operating over CIF2. It is noted that step 52 represents here generic means for analyzing content of application information in messages delivered over the transmission path between SR1 and BSk. Other exemplary mechanisms may be applied, and for example for the successively transmitted messages comprise numbering of successive messages and use of checksums, or the like.

SRi is now accessible (step 53) to BSk via CIF1, and ready to receive a location update message MSi from BSk. Let us assume that in this simplified example, multicasting is to be applied as long as the sum of differrences between timestamps of three successively received location update messages from BSk does not exceed a predefined limit LIM, location update messages may be delivered from BSk to SRi by multicasting. This implies that as long as C1 is valid, CIF1 applying UDP may be used between BSk and SRi. On the other hand, if the transmission path is not in good order, too many packets are lost and the difference between timestamps of successively received messages begins to increase, controlled transmissions applying TCP should be taken into use. In this example, this implies that as long as C1 is not valid, C2 is valid and CIF2 should be used between BSk and SRi.

Thus, when a location update message is received (step 54), F extracts from content of the message the timestamp of the message and provides it as an indication to SLOP. SLCP retrieves (step 55) C1, C2 and any possible accumulated information data, stored from earlier messages. In this case the accumulated information comprises the difference between the timestamps of the two recently received messages. SLOP adds the retrieved accumulated information data to the difference between the timestamps of the received and the previous message, and compares (step 56) the resulting sum to a LIM value. LIM represents here means for analysing application data to determine whether data packets expectedly transmitted from the other communication endpoint, BSk, have been duly received or not. For example here LIM is used to show cases where the time period between timestamps of a first and a third application data block is too long. In such a case it is probable that an expected data packet is not received. One or more data packets are thus deemed to be missed between data packets carrying the respective application data blocks.

If the sum of the two successive intervals between received messages is less than LIM, it seems that the location data updates have been received according to the transmission scheme and messages are not exceedingly missed in unreliable transmissions. In such a case, C1 is valid and CIF1 may be used (step 57) as the applied communication interface for the transmissions between BSk and SRi.

On the other hand, if the sum exceeds LIM, data packets have been missed in unreliable transmissions and the location data updates have not been duly received according to the transmission scheme. C2 is thus valid and the unreliable transmission of CIF1 is not applicable anymore. In such a case SLOP informs F on the deviation, i.e. on missed messages and possibly indicates to F that a corrective action (step 58) is required. In this example, the SLOP informs F that operation via CIF1 is not in acceptable level and instructs to change to communication interface CIF2 for the transmissions between BSk and SRi.

It is noted that step 58 represents here an example of a corrective action taken in SRi after F detects that the communication interface applying unreliable transmissions does not operate in acceptable level. The corrective actions may vary from application to application, but advantageously comprise moving to use another communication paradigm that provides better success rate for deliveries, even at the cost of some other characteristic, for example use of communication resources from SRi and BSk, or higher communication costs.

In the majority of applications SLCP monitors unreliable transmissions via incoming application information, so the corrective action typically includes an exchange of messages between the endpoints of the monitored communication path, here SRi and BSk. In the present example, SLCP monitors successive transmissions of each base station, so when informing F about the problems in the unreliable communication path, SLCP also provides identity of the BSk in question. F may thus generate and send to BSk a message requesting to apply CIF2 in next transmissions of location information updates.

However, the corrective action does not necessarily need to involve communications with the transmitting endpoint. In another aspect, the communication system may comprise an intermediate node, for example a master node to which essentially all base stations in an area may send their location update messages via reliable transmission mechanisms. The corrective action may comprise retrieving updates for location information of BSk from the intermediate node SRi and apply the mediated location information as long as the compromised conditions associated to C2 prevail. Reception and monitoring of BSk multicast messages may be continued normally, and when the check of step 56 indicates that conditions associated to C1 prevail, use of intermediate node may be ended.

In the present example, multicast transmissions were scheduled so that the status of the unreliable transmission path could be monitored on the basis of the timing of these scheduled transmissions. If scheduled transmissions are not used, the transmitting endpoints may be configured to transmit unreliable dummy messages according to a defined schedule. F and SLCP recognize the dummy messages as such, and on the basis of their timing, SLOP determine whether unreliable transmissions achieve acceptable success rate, i.e. whether unreliable transmissions may be applied or not.

On the other hand, the monitored operative characteristic is an application-specific choice and does not necessarily need to rely on timing of the messages. For example, F may be a speech coding application of a user terminal that operates in a packet switched network where IP packets are delivered via unreliable transmission protocol, for example, via IP multicasting that applies UDP. F may be configured to feed to SLCP samples of its decoded speech, and SLCP may be configured to test a defined characteristic of the speech to determine whether the quality achieved with unreliable transmission method is acceptable or not. If not, SLCP requests F to initiate a corrective action, as described above. Other monitoring mechanisms depending solely on content of the application data forwarded by the lower layers may be applied without deviating from the scope of protection.

Furthermore, the corrective action does not necessarily need to involve change of the applied communication interface. In an aspect, the receiving endpoint may request the transmitting endpoint to at least temporarily improve the quality of the transmission path by increasing the number of retransmissions of the multicast messages. For example, in the present embodiment F may be configured to generate in step 58 to BSk a message requesting it to adopt an improved retransmission scheme. Correspondingly, in step 57 F should generate to BSk a message requesting it to return to the original scheme with reduced retransmissions.

Accordingly, by means of the proposed procedure an application in a communications device and operating on received IP data packets may automatically and essentially autonomously monitor the quality achieved by non-acknowledged transmissions. On the basis of this monitoring, it may determine whether the achieved level matches with its own specific requirements, and on the basis of this match initiate a corrective action.

In a further embodiment of the invention, the application may also adjust its operations to match with the different characteristics of the new applied communication interface. For example, let us assume that the communication device CD of FIG. 3 is a user terminal that receives live video data from a video application server in a configuration disclosed in FIG. 1. During normal operation, the video server CE2 transmits video data to the user terminal CE1 in IP multicast data packets over the communications system CS. The video application in the user terminal is arranged to receive from the video decoder over a broadband communication interface a video stream resulting from received and decoded video data packets. The video application also comprises a function that inputs sample frames, or a sequence of sample frames, extracted at defined intervals, and analyses therefrom a characteristic, the properties of which change according to the success of the delivery of the video data packets in the communications system.

For example, let us assume that the video frames transmitted from the video application server CE2 are consecutively numbered and the video application in the user terminal CE1 is configured to read the number of frames rendered in the user terminal. Video is a very poorly delay-tolerant media, so if a data packet is missed or it is considerably delayed in transmission, the frame(s) delivered in the data packet is dropped from the video stream. Accordingly, the application may take a sequence of rendered frames, read their frame numbers and check how many frames are missing from the sequence. The check may be implemented, for example, by comparing the percentage of missed frames to a threshold number. If too many frames are missed, the video application deems that the quality of the transmission path is too low.

It is clear that the user is likely to visually observe degradations in the video quality, but his options to react to them are very limited. Basically he may decide to endure the substandard picture or terminate the application. However, if the video transmission is very critical, for example the video cornprises live footage from a hostage situation; the user would naturally need more options than to operate without any picture or stare at a screen trying to interpret some foggy objects in it. In the present embodiment an improvement is provided, according to the invention, by configuring the video application to, in response to deeming the quality of the transmission path by IP multicasting too low, de-activate the presently applied broadband communication interface and move over to apply a communication interface that in the present location provides a better transmission quality. Let us assume here that the communication interface is a cellular radio interface that provides a good local coverage but a considerably narrower bandwidth.

It is clear that transmission of video data over the narrower communication path is not sensible, so in this embodiment, when the user terminal informs the video application server on the problems in the broadband interface, and requests changing over to the cellular radio interface, it also requests the video application server to adjust the application to conform the new applied communication paradigm. In the exemplary case, the video application server recognises the request, moves to apply the cellular radio interface and instead of sending live video, begins to send at intervals still images extracted from the video data stream. The video application in the user terminal refreshes the display with a new video frame when such arrives. The user thus has at any time available very current and good quality image data from the scene, which gives much better support for the ongoing operation than the foggy video image.

As earlier, the video application is preferably configured to at least from time to time activate the broadband communication interface and again analyse the status of the respective transmission path according to the number of missing frames an analysed sequence. Whenever the quality of the here preferred transmission path returns to acceptable level, the video application initiates exchange of communications with the video data server to move over to broadband interface and use of video streams carrying live footage.

In an embodiment the invention is implemented as a computer program product encoding instructions for executing a computer process for the described operation of the communication device of FIG. 3. The computer program product may be stored in a distribution medium comprising a computer readable medium, a program storage medium, a record medium, a computer readable memory, a computer readable software distribution package, a computer readable signal, a computer readable telecommunications signal, or a computer readable compressed software package.

It will be obvious to a person skilled in the art that, as the technology advances, the inventive concept can be implemented in various ways. The invention and its embodiments are not limited to the examples described above but may vary within the scope of the claims.

The invention claimed is:

1. A method, comprising:
running an application using application data delivered in data packets that become accessible via packet data transmission mechanism from a peer entity;
receiving one or more data packets;
determining from application data in the received one or more data packets at least one value for a predefined application-specific operational characteristic that varies according to the success or failure of the transmissions of the one or more data packets, and the application being configured with a predefined operational range for the predefined application-specific operational characteristic;
comparing the value of the predefined application-specific operational characteristic to the predefined operational range;
in response to the predefined application-specific operational characteristic exceeding the predefined operational range, initiating an action for changing the packet data transmission mechanism applied in reception of application data.

2. A method according to claim 1, wherein the application data is information forwarded transparently to the application from lower protocol layers applied by the packet data transmission mechanism.

3. A method according to claim 1, wherein the predefined application-specific operational characteristic is a predefined property of the application data, the property being measurable by the application from the application data.

4. A method according to claim 3, wherein the predefined application-specific operational characteristic corresponds to one of the following: timing of data packets in a series of successful transmissions of particular type of application data, consistency in numbering included in application data packets, and correctness of a checksum computed from received application data.

5. A method according to claim 3, further comprising;
using received application data in a procedure of the application;
receiving a result from the procedure;
computing the value to the predefined application-specific operational characteristic from the result.

6. A method according to claim 5, wherein the application data comprises coded media data and the procedure of the application is a procedure for decoding the data.

7. A method according to claim 4 wherein the application data comprises location update messages delivered via unreliable transmission mechanism from a base station;
the predefined application-specific operational characteristic corresponds to interval between two or more successively received location update messages; the method comprising:
in response to the interval between two or more successively received location update messages exceeding the predefined operational range, initiating an action for retrieving location updates of the base station from an intermediate master node.

8. A method according to claim 1, further comprising
changing the packet data transmission mechanism applied in transmissions with the peer entity from an original packet data transmission mechanism to a changed packet data transmission mechanism;
running the application in an adjusted mode in which the operations of the application are adjusted to match with the characteristics of the changed packet data transmission mechanism when the changed packet data transmission mechanism is used.

9. A method according to claim 1, further comprising:
changing the packet data transmission mechanism applied in transmissions with the peer entity from an original packet data transmission mechanism to a changed packet data transmission mechanism;
receiving, when the changed packet data transmission mechanism is used, one or more data packets via the original packet data transmission mechanism;
determining the predefined application-specific operational characteristic and comparing it to the predefined operational range;
in response to the determined predefined application-specific operational characteristic being in the predefined operational range, initiating an action for returning to the original packet data transmission mechanism.

10. A method according to claim 1, further comprising
transmitting during pauses in application data transmissions dummy messages;
including in the dummy messages information that allows determining at least one value for the predefined application-specific operational characteristic.

11. A method according to claim 1, further comprising:
changing the packet data transmission mechanism applied in transmissions with the peer entity from an original packet data transmission mechanism to a changed packet data transmission mechanism;
the original packet data transmission mechanism applies Internet Protocol multicasting;
the changed packet data transmission mechanism applies Transmission Control Protocol.

12. A computer program product embodied in a non-transitory medium encoding instructions for executing a computer process for running an application using application data delivered in data packets that become accessible via packet data transmission mechanism from a peer entity; receiving one or more data packets; determining from application data in the received one or more data packets at least one value for a predefined application-specific characteristic that varies according to the success or failure of the transmissions of the one or more data packets, and the application being configured with a predefined operational range for the predefined application-specific characteristic;
comparing the value of the predefined application-specific characteristic to the predefined operational range;
in response to the predefined application-specific characteristic exceeding the predefined operational range, initiating an action for changing the packet data transmission mechanism applied in reception of application data.

13. A method, comprising:
running an application using application data delivered in data packets that become accessible via packet data transmission mechanism from a peer entity, the application data comprising location update messages delivered via unreliable transmission mechanism from a base station;
receiving one or more data packets;
determining from application data in the received one or more data packets a value for a predefined application-specific operational characteristic that corresponds to an interval between two or more successively received location update messages;
comparing the value to a predefined operational range predefined for the interval between two or more successively received location update messages;
in response to the value exceeding the predefined operational range, initiating an action for retrieving location updates of the base station from an intermediate master node.

14. An apparatus configured to use a cache and directly a storage, the computing apparatus comprising
at least one processor; and
at least one memory including computer program code;
the at least one memory and the computer program code configured to, with the at least one processor, cause the computing apparatus at least to
run an application using application data delivered in data packets that become accessible via packet data transmission mechanism from a peer entity;
receive one or more data packets;
determine from application data in the received one or more data packets at least one value for a predefined application-specific operational characteristic that varies according to the success or failure of the transmissions of the one or more data packets, and the application being configured with a predefined operational range for the predefined application-specific operational characteristic;
compare the value of the predefined application-specific operational characteristic to the predefined operational range;
initiate, in response to the predefined application-specific operational characteristic exceeding the predefined operational range, a correction action.

15. An apparatus as claimed in claim 14, wherein the at least one memory and the computer program code configured to, with the at least one processor, further cause the computing apparatus to:
change, in response to the correction action being initiated, the packet data transmission mechanism applied in transmissions with the peer entity from an original packet data transmission mechanism to a changed packet data transmission mechanism; and
run the application in an adjusted mode in which the operations of the application are adjusted to match with the characteristics of the changed packet data transmission mechanism when the changed packet data transmission mechanism is used.

16. An apparatus as claimed in claim 14, wherein the at least one memory and the computer program code configured to, with the at least one processor, further cause the computing apparatus to:
receive, when the changed packet data transmission mechanism is used, one or more data packets via the original packet data transmission mechanism;
determine, when the changed packet data transmission mechanism is used, a second value of the predefined application-specific operational characteristic of the one or more data packets via the original packet data transmission mechanism;
compare the second value of the predefined application-specific operational characteristic to the predefined operational range; and
initiate, in response to the second value of the determined predefined application-specific operational characteristic being in the predefined operational range, an action for returning to the original packet data transmission mechanism.

17. An apparatus as claimed in claim 14, wherein the at least one memory and the computer program code configured to, with the at least one processor, further cause the computing apparatus to:
use as the predefined application-specific operational characteristic a predefined property of the application data comprising location update messages delivered via unreliable transmission mechanism from a base station, the predefined property being measurable by the application from the location update messages and corresponding to one of the following group comprising timing of data packets in a series of successful transmissions of the location update messages, consistency in numbering included in the location update messages, and correctness of a checksum computed from a received location update message, the property;
initiate in response to the interval between two or more successively received location update messages exceeding the predefined operational range the correction action, the correction action comprising starting to retrieve for location updates of the base station from an intermediate master node.

18. An apparatus as claimed in claim 14, wherein the apparatus is one of the following: a network node, a server, and a user terminal configured with at least two packet data transmission mechanisms for operating in a communications system.

* * * * *